US010977475B2

(12) United States Patent
Jin et al.

(10) Patent No.: US 10,977,475 B2
(45) Date of Patent: Apr. 13, 2021

(54) FINGERPRINT RECOGNITION SENSOR AND DISPLAY DEVICE HAVING THE SAME

(71) Applicant: SILICON DISPLAY TECHNOLOGY, Yongin-si (KR)

(72) Inventors: Jong Woo Jin, Seoul (KR); Jin Hyeong Yu, Incheon (KR); Hyunwoo Jin, Daegu (KR); Jun Woo Chung, Yongin-si (KR); Youn Duck Nam, Suwon-si (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 16 days.

(21) Appl. No.: 16/503,863

(22) Filed: Jul. 5, 2019

(65) Prior Publication Data

US 2020/0012833 A1  Jan. 9, 2020

(30) Foreign Application Priority Data

Jul. 9, 2018  (KR) .......................... 10-2018-0079276
May 27, 2019  (KR) .......................... 10-2019-0062120

(51) Int. Cl.
*G06K 9/00* (2006.01)
(52) U.S. Cl.
CPC ....... *G06K 9/0004* (2013.01); *G06K 9/00053* (2013.01); *G06K 9/00087* (2013.01)
(58) Field of Classification Search
None
See application file for complete search history.

(56) References Cited

U.S. PATENT DOCUMENTS

| 2014/0118419 | A1* | 5/2014 | Wu ..................... G02F 1/133514 345/690 |
| 2017/0161543 | A1* | 6/2017 | Smith ................ G06K 9/00013 |
| 2018/0053032 | A1* | 2/2018 | Ding .................... G06K 9/0004 |
| 2018/0268190 | A1* | 9/2018 | Chung ............... G06K 9/00013 |
| 2019/0228204 | A1* | 7/2019 | Park ......................... G09G 3/22 |

FOREIGN PATENT DOCUMENTS

| KR | 10-1349924 | 1/2014 |
| KR | 10-1702084 | 2/2017 |
| KR | 10-2018-0135584 | 12/2018 |
| KR | 10-2019-0016635 | 2/2019 |
| WO | 2017-095880 | 6/2017 |

* cited by examiner

*Primary Examiner* — Joseph R Haley
(74) *Attorney, Agent, or Firm* — Lex IP Meister, PLLC

(57) ABSTRACT

A fingerprint recognition sensor according to an exemplary embodiment of the present invention includes: a photo sensor for sensing light that is diffuse-reflected from a finger of a user and incident on the photo sensor, or that is transmitted through the finger and incident on the photo sensor; a first matrix positioned on the photo sensor and including a first opening; a second matrix positioned on the first matrix and including a second opening; and a cover layer including one surface contacting the finger and positioned on the second matrix, wherein, from among light that is diffuse-reflected from the finger and incident on the cover layer or that is transmitted through the finger and incident on the cover layer, light having an angle, formed by a normal line on the one surface of the cover layer and a path of the light incident on the cover layer, that is greater than a critical angle, sequentially passes through the second opening and the first opening and is incident on the photo sensor.

17 Claims, 16 Drawing Sheets

FINGERPRINT RECOGNITION SENSOR AND DISPLAY DEVICE HAVING THE SAME

CROSS-REFERENCE TO RELATED APPLICATION

This application claims priority to and the benefit of Korean Patent Application No. 10-2018-0079276 filed in the Korean Intellectual Property Office on Jul. 9, 2018, and Korean Patent Application No. 10-2019-0062120 filed in the Korean Intellectual Property Office on May 27, 2019, the entire contents of which are incorporated herein by reference.

BACKGROUND OF THE INVENTION

(a) Field of the Invention

A fingerprint recognition sensor and a display device including the same are provided.

(b) Description of the Related Art

A fingerprint recognition technique represents a skill for electronically reading a fingerprint of a finger of a user, comparing the same with previously input data, and distinguishing an identity to confirm the identity of the user, and it has excellent safety and convenience from among biometrics.

For a reliable fingerprint recognition system with high recognition rates and low error rates, it is necessary to acquire high quality images for the fingerprint, and for this, it is required to develop fingerprint recognition sensors with excellent performance.

Recently, the fingerprint recognition sensor has generally used a capacitive type and an optical type, and the optical fingerprint recognition sensor has a structure including a light source and a photo sensor. The photo sensor may generate a fingerprint image by sensing light output by a light source, that is diffuse-reflected from a finger, or transmitted through the finger.

Korean Patent No. 10-1349924 on the optical fingerprint recognition sensor discloses a configuration of installing a black matrix on an upper portion of a fingerprint sensor to prevent a phenomenon that ambient light is incident on a photodiode to prevent a degree of definition of a fingerprint image from being deteriorated and a configuration in which light of a backlight unit is irradiated to a light outputting unit positioned on a bias electrode by a finger, and the light outputting unit is alternately disposed from a transmitting unit of the black matrix so that the light irradiated from a backlight may be reflected from the fingerprint and may be incident on the photodiode.

However, some of the light irradiated to the finger of the user and then diffuse-reflected may be sensed by the photodiode, and in this instance, the light that is diffuse-reflected and provided toward the photodiode may be incident on the photodiode from the valley and ridge regions of the fingerprint, so a contrast ratio of the fingerprint image may be deteriorated.

SUMMARY OF THE INVENTION

The present invention has been made in an effort to provide a fingerprint recognition sensor and a display device including the same for improving a contrast ratio of a fingerprint image.

The present invention has been made in an effort to provide a fingerprint recognition sensor and a display device including the same for reducing noise.

The present invention has been made in an effort to provide a fingerprint recognition sensor and a display device including the same for reducing a thickness.

The present invention has been made in an effort to provide a fingerprint recognition sensor and a display device including the same for improving easy applicability to another device by designing a position of a light source in various ways.

Exemplary embodiments according to the present invention may be used to realize other tasks that are not mentioned in detail, in addition to the above-noted tasks.

An exemplary embodiment of the present invention provides a fingerprint recognition sensor according to an exemplary embodiment of the present invention, including: a photo sensor for sensing light that is diffuse-reflected from a finger of a user and incident on the photo sensor, or that is transmitted through the finger and incident on the photo sensor; a first matrix positioned on the photo sensor and including a first opening; a second matrix positioned on the first matrix and including a second opening; and a cover layer including one surface contacting the finger and positioned on the second matrix.

Here, from among light that is diffuse-reflected from the finger and incident on the cover layer or that is transmitted through the finger and incident on the cover layer, light having an angle, formed by a normal line on the one surface of the cover layer and a path of the light incident on the cover layer, that is greater than a critical angle, sequentially passes through the second opening and the first opening and is incident on the photo sensor.

The angle formed by the normal line on the one surface of the cover layer and the path of light incident on the photo sensor satisfies Equation 1:

$$\tan^{-1}\left(\frac{w_D}{t_D}\right) \leq \theta_{sa} \leq \tan^{-1}\left(\frac{w_1 + w_D + w_2}{t_1 + t_D + t_2}\right) \qquad \text{[Equation 1]}$$

wherein, in Equation 1, $\theta_{sa}$ is an angle formed by the normal line on the one surface of the cover layer and the path of light incident on the photo sensor, $w_1$ is a width of the first opening, $w_2$ is a width of the second opening, $w_D$ is a width between a vertical projection of the first opening and a vertical projection of the second opening, $t_1$ is a thickness of the first matrix, $t_2$ is a thickness of the second matrix, and $t_D$ is a thickness between the first matrix and the second matrix.

The width between a vertical projection of the first opening and a vertical projection of the second opening may satisfy Equation 2:

$$w_D > t_D \tan\left[\sin^{-1}\left(\frac{n_{air}}{n_S}\right)\right] \qquad \text{[Equation 2]}$$

wherein, in Equation 2, $w_D$ is a width between a vertical projection of the first opening and a vertical projection of the second opening, $t_D$ is a thickness between the first matrix and the second matrix, $n_{air}$ is a refractive index of air, and $n_s$ is an average refractive index of the fingerprint recognition sensor.

The second matrix may include a first light absorbing layer including a light absorbing material, and a first metal layer positioned on the first light absorbing layer.

Light incident on the cover layer from a ridge of a fingerprint of the finger may be incident on the photo sensor, and light incident on the cover layer from a valley of a fingerprint of the finger may be reflected from the first metal layer or may be reflected from or absorbed into the first matrix.

The fingerprint recognition sensor may further include a light source for irradiating light to the finger, wherein the light source may be positioned below the finger, and the light source may be disposed so that an angle formed by light irradiated from the light source with respect to a normal line on one surface of the cover layer may be less than the critical angle.

The fingerprint recognition sensor may further include a light source for irradiating light to the finger, wherein the light source may be positioned below the finger, and an antireflection layer positioned on the second matrix is further included.

The first opening may overlap the second matrix, and the second opening may overlap the first matrix.

A refractive index of the cover layer may be greater than 1.0 and may be equal to or less than 2.0, and the critical angle may be equal to or greater than 30° and may be less than 90°.

A thickness ($t_D$) between the first matrix and the second matrix may be 0.1 to 20 μm.

A thickness of the second matrix may be 140 to 1000 nm.

The fingerprint recognition sensor may be divided into a plurality of sensor pixels, the second matrix may be positioned on each sensor pixel, and a second matrix of the adjacent sensor pixel may be electrically connected thereto.

A transparent electrode positioned on the second matrix and including a transparent conductive oxide may be included.

The first matrix may include a second metal layer and a second light absorbing layer positioned on the second metal layer and including a light absorbing material.

The fingerprint recognition sensor may further include a thin film transistor for transmitting a current signal caused by generation of charges by the photo sensor to a data lead-out line, wherein the photo sensor may include a first electrode on which a drain electrode of the thin film transistor is extended to be formed, a semiconductor layer positioned on the first electrode, and a second electrode including the transparent material and positioned on the semiconductor layer, and wherein the first electrode and the second electrode may form a capacitor.

The first matrix may include a metal layer and a light absorbing layer positioned on the metal layer and including a light absorbing material.

Light incident on the cover layer from a ridge of a fingerprint of the finger may be incident on the photo sensor, and light incident on the cover layer from a valley of a fingerprint of the finger may be reflected from or absorbed into the second matrix or may be absorbed by the light absorbing layer.

A thickness of the first matrix may be 140 to 1000 nm.

Another embodiment of the present invention provides a display device including a display panel for displaying an image or video, and a fingerprint recognition sensor of claim 1 positioned in at least one region on the display panel.

The fingerprint recognition sensor and the display device including the same according to an exemplary embodiment of the present invention may improve the contrast ratio of the fingerprint image, may reduce noise, may reduce the thickness, and may allow design of the position of the light source in various ways, thereby improving easy applicability to other devices.

DETAILED DESCRIPTION OF THE EMBODIMENTS

Figure 1A:
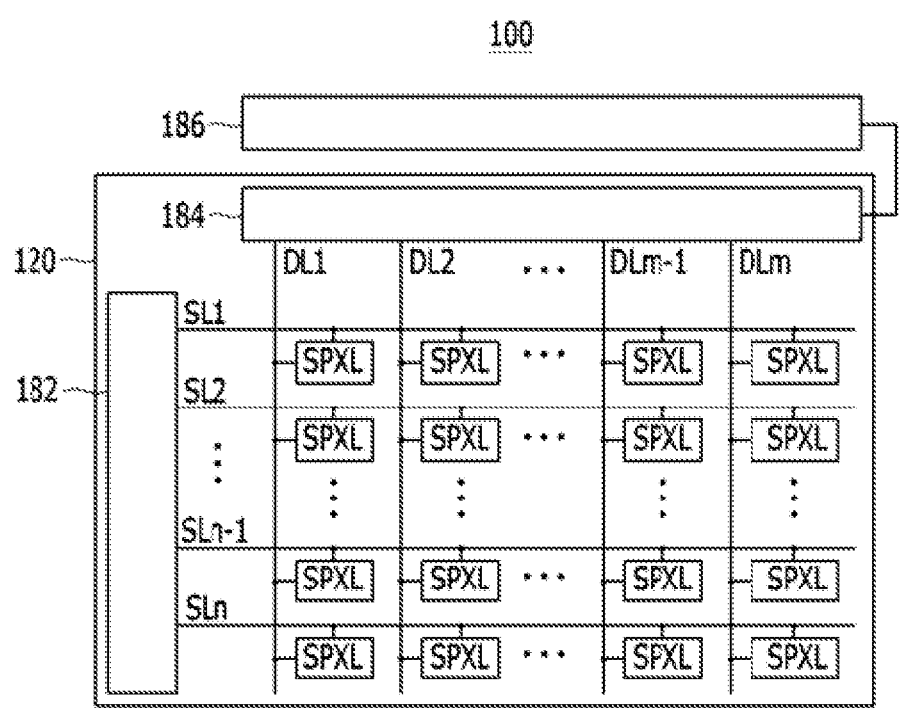
FIG. 1A shows a method for driving a fingerprint recognition sensor according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification. Further, a detailed description of a well-known related art will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. When an element is referred to as being "directly on" another element, there are no intervening elements present. On the contrary, it will be understood that when an element such as a layer, film, region, or substrate is referred to as being "below" another element, it can be directly below the other element or intervening elements may also be present. When an element is referred to as being "directly below" another element, there are no intervening elements present.

Unless explicitly described to the contrary, the word "comprise" and variations such as "comprises" or "comprising" will be understood to imply the inclusion of stated elements but not the exclusion of any other elements.

Figure 1B:
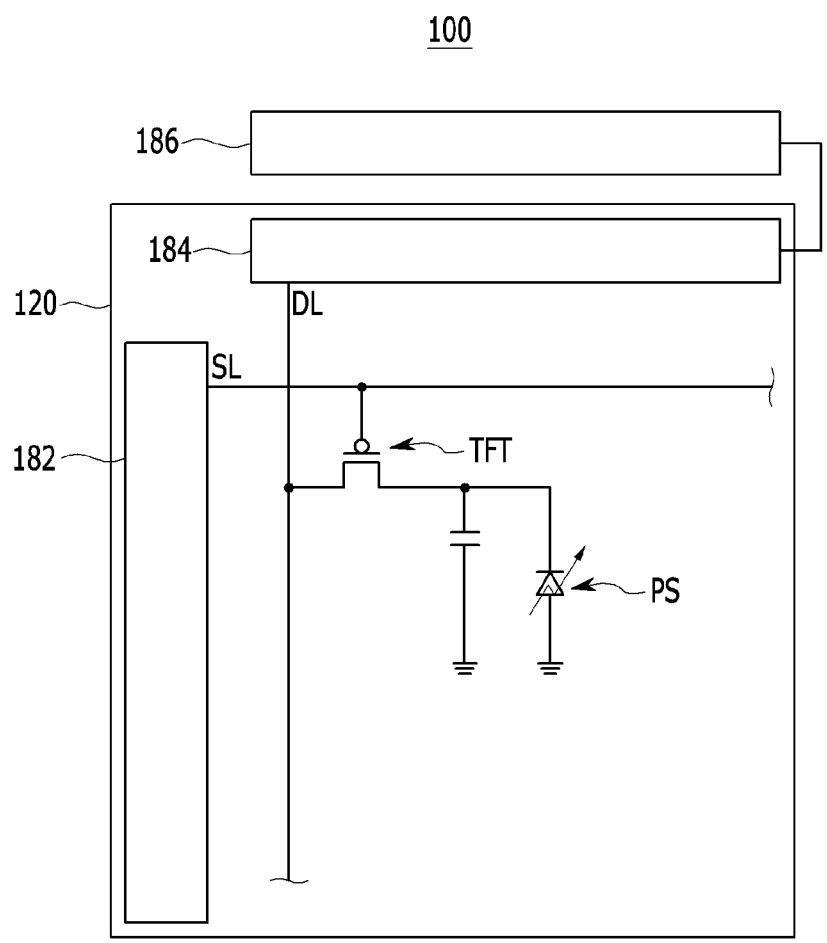
FIG. 1B shows a method for driving a sensor pixel from among a fingerprint recognition sensor of FIG. 1A.

FIG. 1A shows a method for driving a fingerprint recognition sensor according to an exemplary embodiment, and FIG. 1B shows a method for driving a sensor pixel from among a fingerprint recognition sensor of FIG. 1A.

Referring to FIG. 1A and FIG. 1B, the fingerprint recognition sensor 100 includes a plurality of scan lines (SL1 to SLn) and a plurality of data lead-out lines (DL1 to DLm) positioned on a substrate 120. Here, a plurality of scan lines (SL1 to SLn) may be disposed in parallel to each other in a separated way, and a plurality of data lead-out lines (DL1 to DLm) may also be disposed in parallel to each other in a separated way. A plurality of scan lines (SL1 to SLn) and a plurality of data lead-out lines (DL1 to DLm) may cross each other, and sensor pixels (SPXL) may be defined in respective crossing regions. However, this is exemplary, and a plurality of scan lines (SL1 to SLn) and a plurality of data lead-out lines (DL1 to DLm) may be arranged in another way or may cross each other in another form.

The sensor pixel (SPXL) includes a thin film transistor (TFT) electrically connected to a plurality of scan lines (SL1 to SLn) and a plurality of data lead-out lines (DL1 to DLm) and switching the sensor pixel (SPXL), and a photo sensor (PS) connected to a drain electrode of the thin film transistor (TFT).

The thin film transistor (TFT) includes a gate electrode connected to a scan line (SL), a source electrode connected to a data lead-out line (DL), and a drain electrode connected to the photo sensor (PS). Here, two electrodes included in the photo sensor (PS) may form a capacitor.

The fingerprint recognition sensor 100 may include a scan line driver 182 for driving a plurality of scan lines (SL1 to SLn), and a lead-out controller 184 and a lead-out driver 186 for driving a plurality of data lead-out lines (DL1 to DLm).

The scan line driver 182 supplies a gate signal to the scan line (SL). The scan line driver 182 may select the scan line (SL) of the sensor pixel (SPXL) from which a fingerprint image is detected, and the thin film transistor (TFT) may be turned on. Although not shown, the scan line driver 182 may include a shift register for generating a gate signal for sequentially supplying a gate signal to the thin film transistor (TFT), and a level shifter for level-shifting the gate signal supplied to the sensor pixel (SPXL) to a voltage used for switching.

The lead-out controller 184 and the lead-out driver 186 detect a current signal generated by the sensor pixel (SPXL) selected by the gate signal. Although not shown, the lead-out controller 184 may include a multiplexer for selecting one of a plurality of data lead-out lines (DL1 to DLm) and outputting to the lead-out driver 186, a shift register for generating a switching signal of the multiplexer, and a level shifter for raising an output voltage from the shift register.

When light that is diffuse-reflected from the fingerprint reaches the photo sensor (PS) and a current signal according to a change of resistance is generated, charges are stored in the capacitor, and when the thin film transistor (TFT) is turned on, the stored charges are transmitted to the data lead-out line (DL) through the thin film transistor (TFT), and may be transmitted to the lead-out driver 186 by the lead-out controller 184.

Figure 2A:
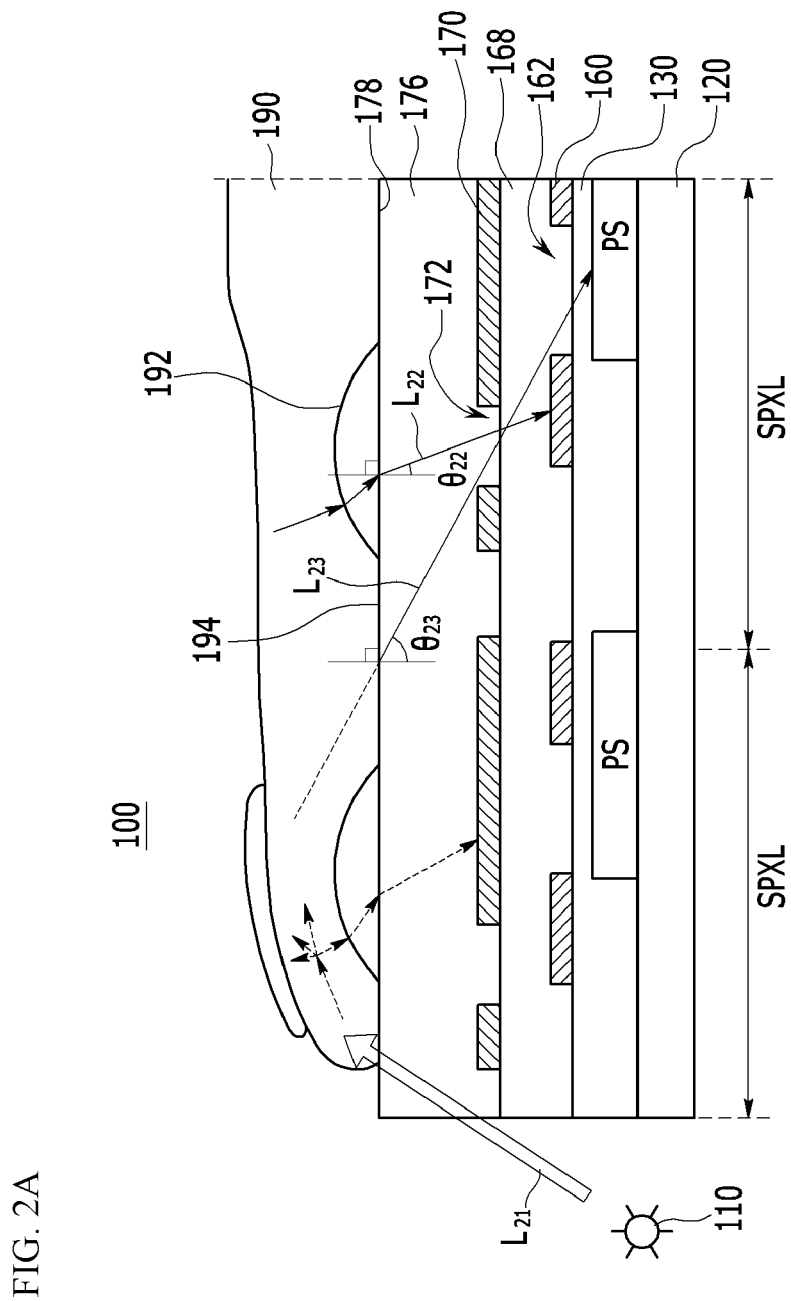
FIG. 2A to FIG. 2D show cross-sections of a fingerprint recognition sensor according to exemplary embodiments.

FIG. 2A shows a cross-section of a fingerprint recognition sensor according to an exemplary embodiment. FIG. 2A may show a cross-section of a portion corresponding to two sensor pixels (SPXL).

Referring to FIG. 1A to FIG. 2A, the fingerprint recognition sensor 100 includes a photo sensor (PS) for sensing light ($L_{23}$) that is diffuse-reflected from a finger 190 of a user, or that is transmitted through the finger 190 and incident on the photo sensor (PS). The fingerprint recognition sensor 100 includes a first matrix 160 positioned on the photo sensor (PS) and including a first opening 162, a second matrix 170 positioned on the first matrix 160 and including a second opening 172, one surface 178 for contacting the finger 190, and a cover layer 176 for covering the second matrix 170.

The photo sensor (PS) may be included in a sensor array 130 positioned on the substrate 120, and the sensor array 130 includes a thin film transistor (TFT) and a photo sensor (PS). The first matrix 160 is positioned on the sensor array 130.

The user may contact the one surface 178 of the cover layer 176 of the fingerprint recognition sensor 100 by the finger 190, and when light ($L_{21}$) is irradiated to the finger 190, it is diffuse-reflected inside the finger 190, and some ($L_{22}$ and $L_{23}$) of the diffuse-reflected light passes through a valley 192 or a ridge 194 of the fingerprint and is then incident on the cover layer 176.

From among the light ($L_{22}$ and $L_{23}$) incident on the cover layer 176, the light ($L_{23}$) having an angle ($\theta_{23}$), formed by a normal line (vertical line) on the one surface 178 of the cover layer 176 and the path of the light incident on the cover layer 176, that is greater than a critical angle, sequentially passes through the second opening 172 and the first opening 162 and is then incident on the photo sensor (PS). On the contrary, from among the light ($L_{22}$ and $L_{23}$) that is diffuse-reflected from the finger 190 and incident on the cover layer 176, the light ($L_{22}$) having an angle ($\theta_{22}$), formed by the normal line on the one surface 178 of the cover layer 176 and the path of the light incident on the cover layer 176, that is less than the critical angle, is absorbed or reflected by the first matrix 160 or the second matrix 170, so it is not incident on the photo sensor (PS). In this instance, the light ($L_{23}$) incident on the photo sensor (PS) is shown to be a bright portion in the fingerprint image.

In the present specification, the critical angle signifies a minimum angle for generating total reflection on the interface (one surface 178 of the cover layer) of the cover layer 176 and air, when the air exists above the cover layer 176 and the light proceeds from inside the cover layer 176 to the air, and it is equivalent to a maximum angle formed by the light introduced into the cover layer 176 with respect to the normal line on the one surface 178 of the cover layer 176 when light is introduced into the cover layer 176 from the air.

Regarding the fingerprint recognition sensor 100 according to an exemplary embodiment, light ($L_{23}$) having the angle ($\theta_{23}$), formed by the normal line (vertical line) on the one surface 178 of the cover layer 176 and the path of the light incident on the cover layer 176, that is greater than the critical angle, may be light incident on the cover layer 176 from the ridge 194 of the fingerprint of the finger 190, and light ($L_{22}$) having the angle ($\theta_{22}$), formed by the normal line on the one surface 178 of the cover layer 176 and the path of the light incident on the cover layer 176, that is less than the critical angle, may be light incident on the cover layer 176 from the valley 192 of the fingerprint of the finger 190. In other words, the light ($L_{23}$) incident on the cover layer 176 from the ridge 194 of the fingerprint of the finger 190 sequentially passes through the second opening 172 and the first opening 162 and is incident on the photo sensor (PS), and the light ($L_{22}$) incident on the cover layer 176 from the valley 192 of the fingerprint of the finger 190 is absorbed into or reflected from the first matrix 160 or the second matrix 170 and is not incident on the photo sensor (PS).

In the following, a detailed description of the configuration repeating the configuration shown with reference to FIG. 1A to FIG. 2A may be omitted.

Figure 2B:
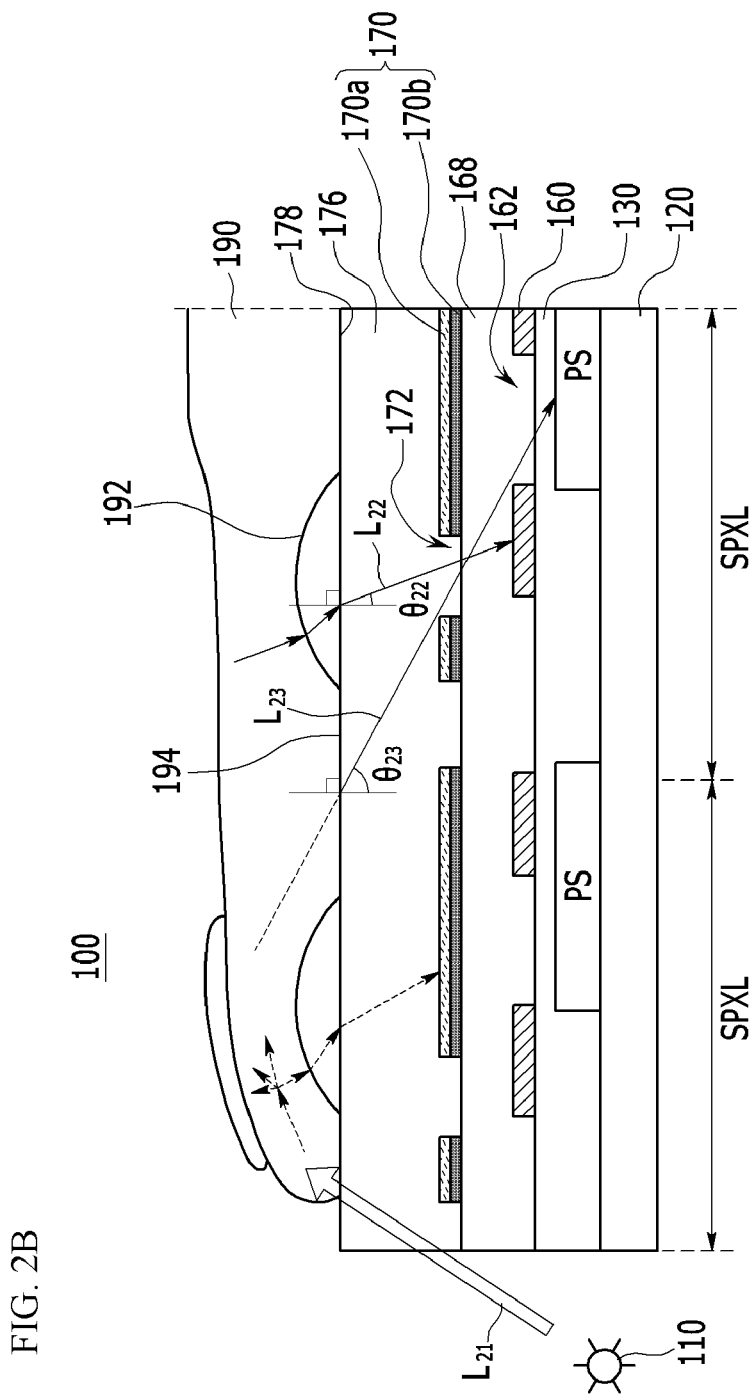
Figure 2C:
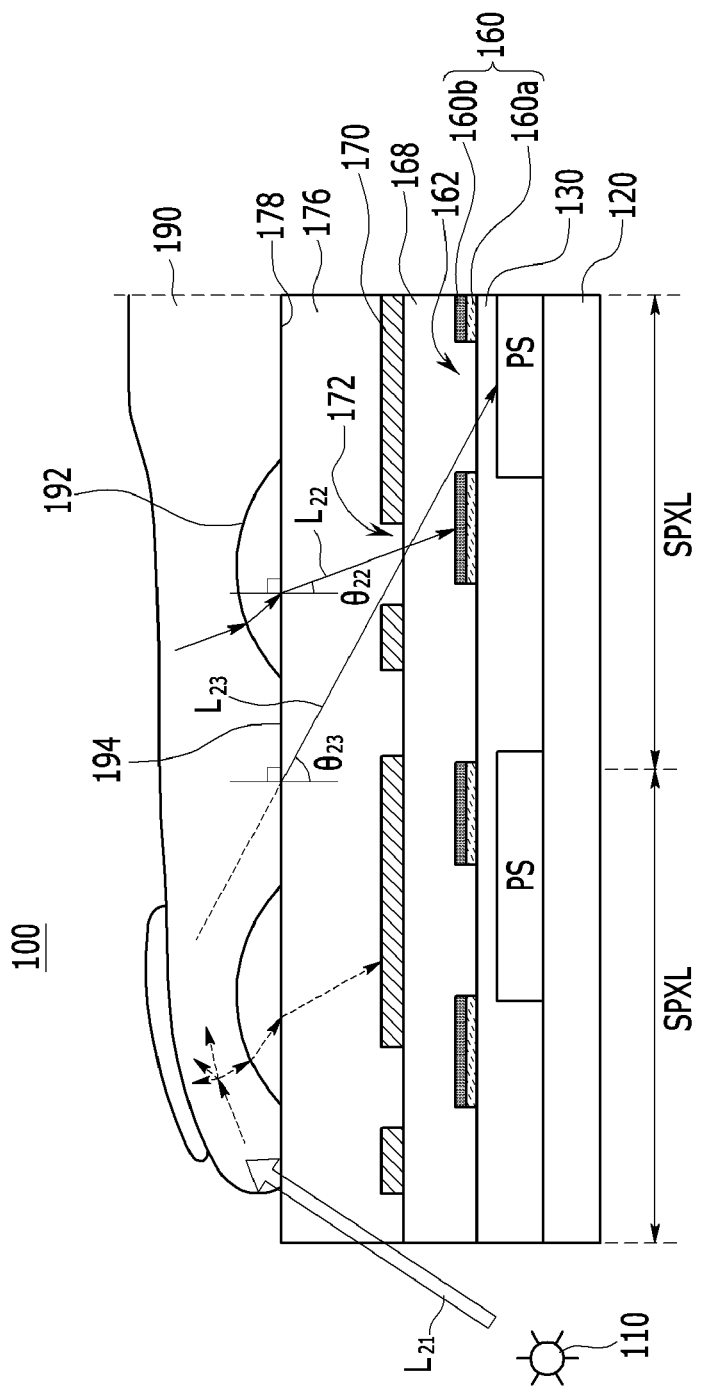
Figure 2D:
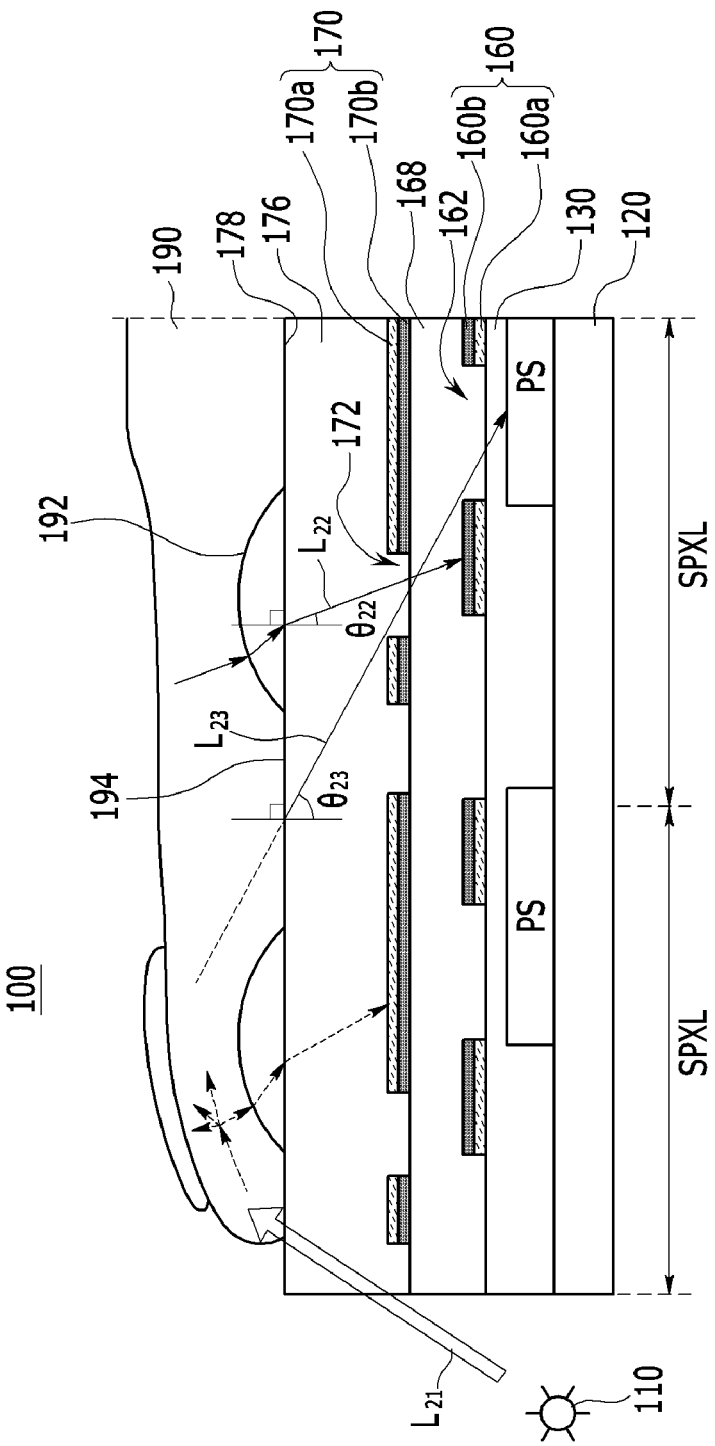

FIG. 2B to FIG. 2D show cross-sections of a fingerprint recognition sensor according to exemplary embodiments. FIG. 2B to FIG. 2D may show cross-sections of a portion corresponding to two sensor pixels (SPXL). FIG. 2B shows a case in which the second matrix 170 is configured with two layers, FIG. 2C shows a case in which the first matrix 160 is configured with two layers, and FIG. 2D shows a case in which the second matrix 170 and the first matrix 160 are respectively configured with two layers.

Referring to FIG. 2B, the second matrix 170 may include a first light absorbing layer 170b including a light absorbing material, and a first metal layer 170a positioned on the first light absorbing layer 170b.

When light is incident on the first light absorbing layer 170b, it may be absorbed and removed. For example, light reflected from a lower structure of the first light absorbing layer 170b and reaching the first light absorbing layer 170b may be absorbed and may then be removed.

For example, when the first matrix 160 and the second matrix 170 are made of metal materials and reflect light, the light ($L_{22}$) incident on the cover layer 176 from the valley 192 of the fingerprint of the finger 190 may be reflected from the first matrix 160, may be reflected again from the second matrix 170, and may be incident on the photo sensor (PS), thereby deteriorating a contrast ratio.

On the contrary, the second matrix 170 according to an exemplary embodiment includes a first light absorbing layer 170b on a lower portion, so the light ($L_{22}$) incident on the cover layer 176 from the valley 192 of the fingerprint of the finger 190 is reflected at the first matrix 160 and it may then be absorbed into the second matrix 170, and hence, light that needs to be blocked may be prevented from being incident on the photo sensor (PS), the contrast ratio of the fingerprint image may be improved, and a degree of definition may be improved.

Absorption of light of the first light absorbing layer 170b may be about 60%, the light may be efficiently removed within this range, and the fingerprint image may be made clearer.

Some of the light incident on the cover layer 176 from the valley 192 of the fingerprint of the finger 190 may be reflected from the first metal layer 170a of the second matrix 170, and may then be removed. In this instance, light transmission of the first metal layer 170a may be less than about 5%.

To sum up, light incident on the cover layer 176 from the valley 192 of the fingerprint of the finger 190 may be reflected from the first metal layer 170a of the second matrix 170 and may be removed; it may be reflected from the first matrix 160, may be absorbed into the first light absorbing layer 170b of the second matrix 170, and may be removed (when the first matrix 160 is made of a metal material); or it may be absorbed into the first matrix 160 and may then become extinct (when the first matrix 160 is made of a light absorbing material).

Regarding the second matrix 170, the thickness of the first light absorbing layer 170b may be about 100 to 600 nm, the thickness of the first metal layer 170a may be about 40 to 400 nm, and the thickness of the second matrix 170 may be about 140 to 1000 nm.

When the second matrix 170 is configured with a single layer and is made of a light absorbing material, the thickness may be equal to or greater than about 1 μm so as to efficiently block the light that needs to be blocked. On the contrary, when the second matrix 170 is made of a first light absorbing layer 170b and a first metal layer 170a in a like manner of an exemplary embodiment described with reference to FIG. 2B, the second matrix 170 may be relatively thin, and the fingerprint recognition sensor 100 may accordingly become thinner. Further, as the second matrix 170 becomes relatively thin in the manufacturing process, the alignment between the first matrix 160 and the second matrix 170 may become more precise, and more precise patterning may be performed.

The light absorbing material of the first light absorbing layer 170b may exemplarily include carbon black, silicon carbide, graphene, carbon nanotubes, and graphite, and without being limited to this, any material for absorbing light may be applied as a light absorbing material.

In another way, the first matrix 160 may include a second metal layer 160a, and a second light absorbing layer 160b positioned on the second metal layer 160a and including a light absorbing material. This case will be described in detail in the portion relating to FIG. 2C and FIG. 2D.

Referring to FIG. 2C, the first matrix 160 includes a metal layer 160a, and a light absorbing layer 160b positioned on the metal layer 160a and including a light absorbing material.

Here, the metal layer 160a of the first matrix 160 may be described as a second metal layer 160a when both the first matrix 160 and the second matrix 170 have a two layer structure as shown in FIG. 2D. Further, the light absorbing layer 160b of the first matrix 160 may be described as a second light absorbing layer 160b when both the first matrix 160 and the second matrix 170 have a two layer structure as shown in FIG. 2D.

When light is incident on the light absorbing layer 160b, it may be absorbed and may be removed. For example, when the light ($L_{22}$) incident on the cover layer 176 from the valley 192 of the fingerprint of the finger 190 is incident on the light absorbing layer 160b of the first matrix 160, it may be absorbed and blocked.

As described above, when both the first matrix 160 and the second matrix 170 are made of metal materials and reflect light, the light ($L_{22}$) incident on the cover layer 176 from the valley 192 of the fingerprint of the finger 190 may be reflected from the first matrix 160, it may be reflected again from the second matrix 170, and it may be incident on the photo sensor (PS), so the contrast ratio may be deteriorated. However, when the first matrix 160 includes a light absorbing layer 160b according to an exemplary embodiment, such an internal reflection phenomenon may be prevented.

Light absorption of the light absorbing layer 160b of the first matrix 160 may be equal to or greater than about 60%, the light may be efficiently removed within such a range, and the fingerprint image may be made more clearly.

In addition, ambient light incident on the fingerprint recognition sensor 100 from a lower portion of the metal layer 160a of the first matrix 160 may be reflected from the metal layer 160a and may become extinct. In this instance, light transmission of the metal layer 160a may be less than about 5%.

To put it simply, light incident on the cover layer 176 from the valley 192 of the fingerprint of the finger 190 may be absorbed into (when the second matrix 170 is made of a light absorbing material) or reflected from (when the second matrix 170 is made of a metal material) the second matrix 170 and may then be removed, or it may be absorbed into the light absorbing layer 160b of the first matrix 160 and may then be removed.

Regarding the first matrix 160, a thickness of the light absorbing layer 160b may be about 100 to 600 nm, a thickness of the metal layer 160a may be about 40 to 400 nm, and a thickness of the first matrix 160 may be about 140 to 1000 nm.

When the first matrix 160 is configured to be a single layer and is made of a light absorbing material, a thickness that is equal to or greater than about 1 μm may be needed so as to efficiently block light that needs be blocked. On the contrary, when the first matrix 160 is configured with a light absorbing layer 160b and a metal layer 160a according to an exemplary embodiment shown with reference to FIG. 2C, the first matrix 160 may be relatively thin, and the fingerprint recognition sensor 100 may accordingly become thin. Further, in the manufacturing process, the first matrix 160 becomes relatively thin, the alignment between the first matrix 160 and the second matrix 170 may become more precise, and more precise patterning may be performed.

The fingerprint recognition sensor 100 may have a structure in which the second matrix 170 includes a first light absorbing layer 170b and a first metal layer 170a, and the first matrix 160 includes a second metal layer 160a and a second light absorbing layer 160b.

In this case, the entire thickness of the fingerprint recognition sensor 100 may be further reduced, applicability to other electronic devices may accordingly be improved, and more precise alignment and patterning may be allowable in the manufacturing process. Further, the light being prevented from being incident on the photo sensor (PS) to be incident on the photo sensor (PS) according to internal reflection may be minimized, thereby substantially improving the contrast ratio and the degree of definition of the fingerprint image.

Figure 3:
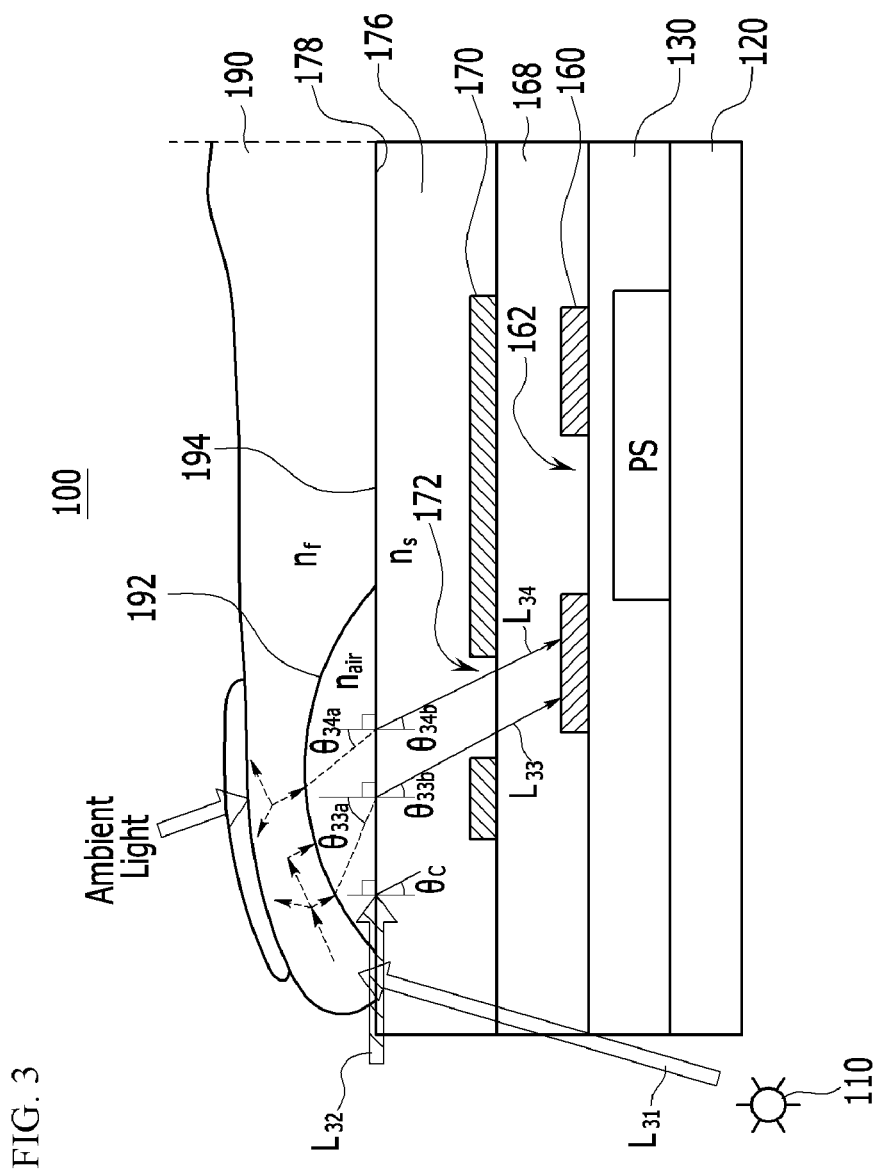
FIG. 3 shows a form for diffuse-reflected light to be incident on a fingerprint recognition sensor from a valley portion of a fingerprint.
Figure 4:
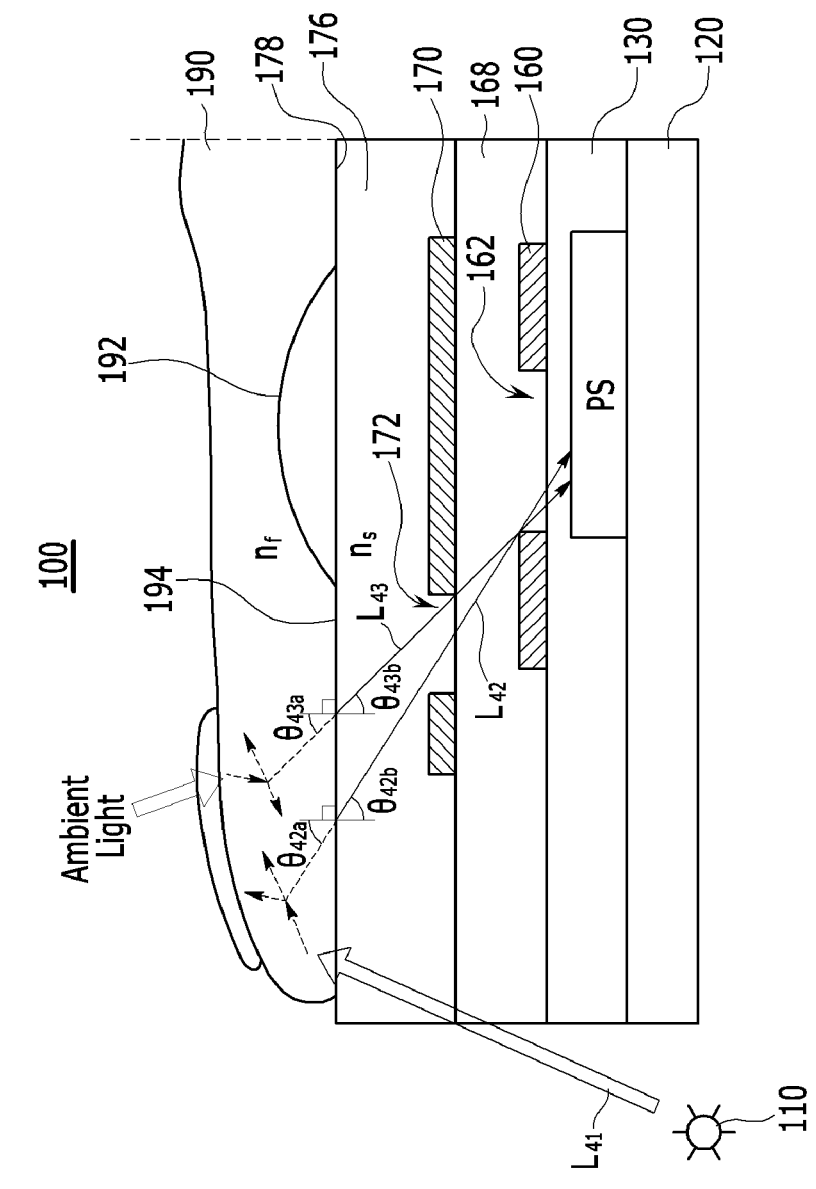
FIG. 4 shows a form for diffuse-reflected light to be incident on a fingerprint recognition sensor from a ridge portion of a fingerprint.

FIG. 3 shows a form for diffuse-reflected light to be incident on a fingerprint recognition sensor from a valley portion of a fingerprint, and FIG. 4 shows a form for diffuse-reflected light to be incident on a fingerprint recognition sensor from a ridge portion of a finger fingerprint. FIG. 3 and FIG. 4 show the case in which the first matrix 160 and the second matrix 170 have a single layer structure, and when the second matrix 170 has a structure that includes a first light absorbing layer 170b and a first metal layer 170a, when the first matrix 160 has a structure that includes a second metal layer 160a and a second light absorbing layer 160b, and when the first matrix 160 and the second matrix 170 respectively have a two-layered structure, the same descriptions to be provided hereinafter may be applied.

Referring to FIG. 3, the fingerprint recognition sensor 100 may further include a light source 110 for irradiating light ($L_{31}$) to the finger 190. The light ($L_{31}$) irradiated by the light source 110 may be diffuse-reflected inside the finger 190. Some light ($L_{33}$) from among diffuse-reflected light passes through the valley 192 of the fingerprint of the finger 190 and is incident on air positioned between the fingerprint and the cover layer 176, and it may be incident on the cover layer 176 from the air and may be absorbed into or reflected from the first matrix 160 or the second matrix 170.

An incident angle ($\theta_{33a}$) of light incident on the one surface 178 of the cover layer 176 from the air and the angle ($\theta_{33b}$) of light input into the fingerprint recognition sensor 100 from the one surface 178 of the cover layer 176 may be determined (Snell's law) according to a refractive index difference between the air and the fingerprint recognition sensor 100. In this instance, the angle ($\theta_{33b}$) of light input into the fingerprint recognition sensor 100 from the one surface 178 of the cover layer 176 corresponds to the angle formed by the normal line on the one surface 178 of the cover layer 176 and the path of the light ($L_{33}$) incident on the cover layer 176.

Here, when the light that is diffuse-reflected inside the finger 190 passes through the valley 192 and is incident on the cover layer 176, the angle formed by the path of the incident light ($L_{33}$) and the normal line on the one surface 178 of the cover layer 176 is formed to be less than the critical angle. In this instance, the critical angle ($\theta_c$) may signify the angle of light ($L_{32}$) that is bent in a direction of the cover layer 176 when the light is incident on the one surface 178 of the cover layer 176 (when the incident angle to the one surface of the cover layer from the air is 90°).

In further detail, an average refractive index ($n_s$) of the fingerprint recognition sensor 100 may be greater than a refractive index ($n_{air}$, about 1.0) of the air, and the refractive index ($n_f$) of the finger may be greater than the refractive index ($n_{air}$) of the air. Therefore, in FIG. 3, $\theta_{33b}$ is formed to be less than $\theta_{33a}$, and $\theta_{34b}$ is formed to be less than $\theta_{34a}$. The incident angle ($\theta_{33a}$) of the light incident on the cover layer 176 from the air to the one surface 178 of the cover layer 176 after the light passes through the valley 192 of the fingerprint and is incident on the air from among the light that is diffuse-reflected inside the finger 190 must be less than 90°, so the angle ($\theta_{33b}$) formed by the light ($L_{33}$) incident on the cover layer 176 and the normal line on the one surface 178 of the cover layer 176 must be less than the critical angle ($\theta_c$) according to Snell's law.

Therefore, the light ($L_{33}$) that passes through the valley 192 of the fingerprint and is incident on the cover layer 176 after the light is irradiated to the finger 190 from the light source 110 and is diffuse-reflected may not be absorbed into or reflected from the first matrix 160 or the second matrix 170 and may not reach the photo sensor (PS), and hence, a portion corresponding to the valley 192 of the fingerprint may be expressed to be darker in the fingerprint image compared to the conventional fingerprint recognition sensor, and the contrast ratio of the fingerprint image may be substantially improved.

Meanwhile, after the ambient light is incident on the finger 190, it may be diffuse-reflected from the finger 190 or it may penetrate through the finger 190 and it may be incident on the cover layer 176 from the valley 192 of the fingerprint. In a like manner of the case of such light ($L_{34}$), the incident angle ($\theta_{34a}$) of light incident on the cover layer 176 from the air to the one surface 178 of the cover layer 176 after it penetrates through the valley 192 of the fingerprint and is introduced to the air must be less than 90°, so the angle ($\theta_{34b}$) formed by the light ($L_{34}$) incident on the cover layer 176 and the normal line on the one surface 178 of the cover layer 176 must be less than the critical angle ($\theta_c$)

Therefore, the light ($L_{34}$) may not reach the photo sensor (PS).

Referring to FIG. 4, the light ($L_{41}$) irradiated by the light source 110 may be diffuse-reflected inside the finger 190, and some light ($L_{42}$) of the diffuse-reflected light may pass through the ridge 194 of the fingerprint of the finger 190 and may be incident on the cover layer 176. In this instance, the light ($L_{42}$) having an angle ($\theta_{42b}$), formed by the path of light ($L_{42}$) and the normal line on the one surface 178 of the cover layer 176, that is greater than the critical angle ($\theta_c$), may pass through the first opening 162 and the second opening 172 and may be incident on the photo sensor (PS). The ridge 194 of the fingerprint may directly contacts the one surface 178 of the cover layer 176, and the refractive index ($n_f$) of the finger 190 may be substantially equivalent to the average refractive index ($n_s$) of the fingerprint recognition sensor 100, and hence, the incident angle ($\theta_{42a}$) when the light ($L_{42}$) is incident on the one surface 178 of the cover layer from the finger 190 may be substantially equivalent to the angle ($\theta_{42b}$) formed by the path of light ($L_{42}$) inside the sensor 100 and the normal line on the one surface 178 of the cover layer 176.

When ambient light is incident on the finger 190, some light ($L_{43}$) from among the diffuse-reflected light may be incident on the cover layer 176, and when the angle ($\theta_{43b}$) formed by the path of light ($L_{43}$) and the normal line of the one surface 178 of the cover layer 176 is greater than the critical angle, it may pass through the first opening 162 and the second opening 172 and may be incident on the photo sensor (PS).

Therefore, a portion corresponding to the ridge 194 of the fingerprint may be expressed to be bright in the fingerprint image.

To summarize, light ($L_{31}$ and $L_{41}$) may be irradiated from the light source 110 or ambient light and may be diffuse-reflected inside the finger 190, some light ($L_{33}$, $L_{34}$, $L_{42}$, and $L_{43}$) from among the diffuse-reflected light may be incident on the cover layer 176, and from among them, light ($L_{42}$ and $L_{43}$) incident on the cover layer 176 from the ridge 194 of the fingerprint of the finger 190 and having angles ($\theta_{42b}$ and $\theta_{43b}$), formed by the light path with respect to the normal line of the one surface 178 of the cover layer 176, that is greater than the critical angle ($\theta_c$), may sequentially pass through the first opening and the second opening 172 and may be incident on the photo sensor (PS) (it is expressed to be bright in the fingerprint image). Also, light ($L_{33}$ and $L_{34}$) incident on the cover layer 176 from the valley 192 of the fingerprint of the finger 190 may be reflected from or absorbed into the first matrix 160 or the second matrix 170, and may not be incident on the photo sensor (PS) (it is expressed to be dark in the fingerprint image). As described above, as the light ($L_{33}$ and $L_{34}$) incident on the cover layer 176 from the valley 192 of the fingerprint may not be incident on the photo sensor (PS), the portion corresponding to the valley 192 of the fingerprint may be expressed to be darker in the generated fingerprint image, and hence, the fingerprint image may be clearer, and the contrast ratio may be substantially improved.

The cover layer 176 may be transparent, and may include a material such as glass, a polymer, an insulating material, or a transparent oxide. For example, the cover layer 176 may be a passivation layer for protecting lower constituent elements, and it may be an insulation layer or a planarization film.

The refractive index of the cover layer 176 may be greater than the refractive index of the air of the cover layer 176. For example, the refractive index of the cover layer 176 may be greater than about 1.0 and may be equal to or less than about 2.0. When the refractive index of the cover layer 176 is within the above-noted range, the critical angle ($\theta_c$) may be equal to or greater than 30° and may be less than 90°.

For example, when the refractive index of the external air of the cover layer 176 is about 1.0 and the cover layer 176 is made of a glass material with a refractive index of about 1.5, the critical angle ($\theta_c$) may be about 42°, when the cover layer 176 includes high-density special glass with a refractive index of about 1.9, the critical angle ($\theta_c$) may be about 32°, and when the cover layer 176 includes a material with a refractive index of about 2.0, the critical angle may be about 30°.

The refractive index of the constituent elements of the lower portion of the cover layer 176 may have an equivalent or similar refractive index to that of the cover layer 176. Therefore, light may be rarely refracted and may proceed inside the fingerprint recognition sensor 100.

Figure 5:
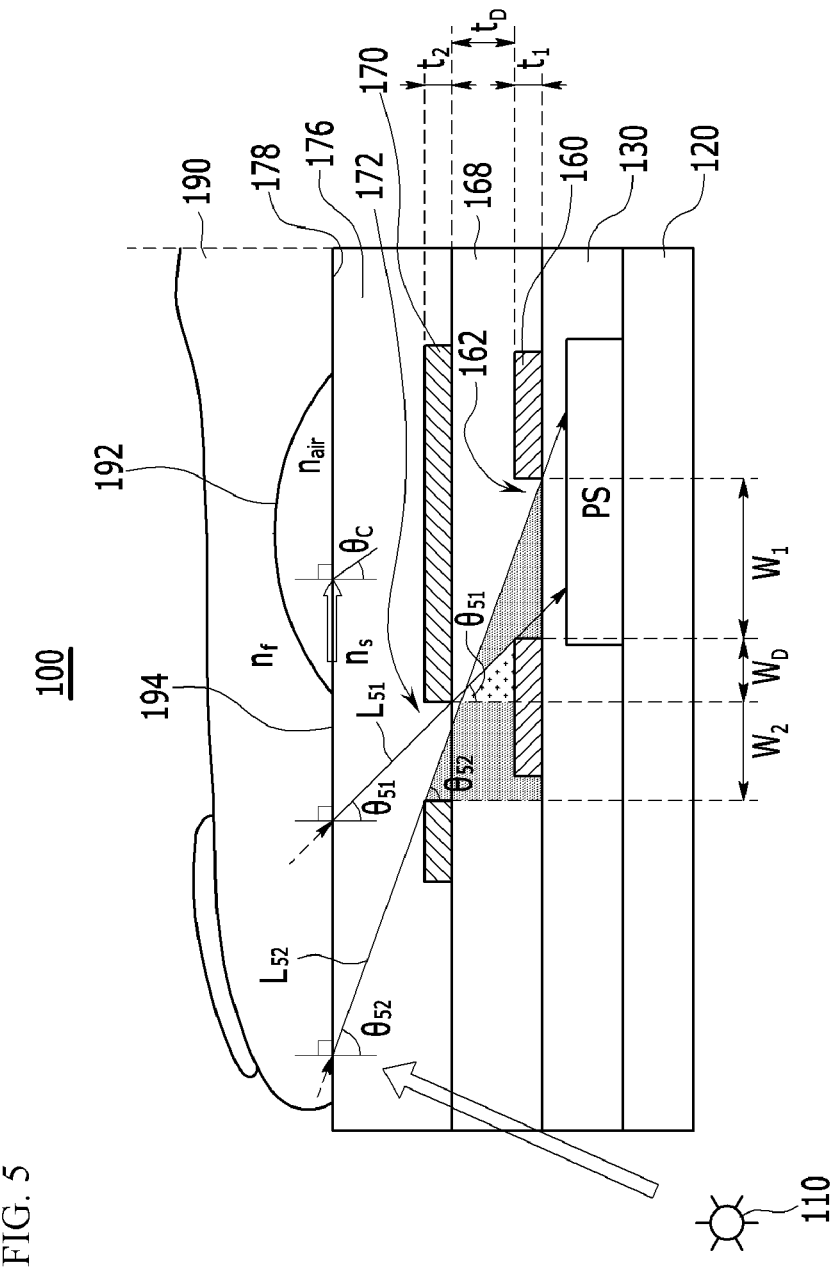
FIG. 5 shows a cross-section of a fingerprint recognition sensor according to an exemplary embodiment.

FIG. 5 shows a cross-section of a fingerprint recognition sensor according to an exemplary embodiment.

Light incident on the photo sensor (PS) from among the light incident on the cover layer 176 will now be described in detail with reference to FIG. 5. FIG. 5 shows that the first matrix 160 and the second matrix 170 have a single layer structure, but the same description as that to be described below is applicable to the case when the second matrix 170 has a configuration including a first light absorbing layer 170b and a first metal layer 170a, the case when the first matrix 160 has a configuration including a second metal layer 160a and a second light absorbing layer 160b, and the case when the first matrix 160 and the second matrix 170 respectively have a two-layered configuration.

The first opening 162 and the second opening 172 are disposed so that light, from among light incident on the cover layer 176, having an angle formed with respect to the one surface 178 of the cover layer 176 that is greater than the critical angle ($\theta_c$), may be incident on the photo sensor (PS). For example, when the first opening 162 and the second matrix 170 are seen in a planar view (when seen from the top or in a thickness direction), they may overlap each other, and when the second opening 172 and the first matrix 160 are seen in a planar view, they may overlap each other. Here, the overlapping seen in a planar view signifies overlapping in the thickness direction (in the vertical direction in the drawing).

Hereinafter, $\theta_{sa}$ is defined to be an angle formed by the normal line on the one surface 178 of the cover layer 176 and the path of light incident on the photo sensor (PS), $w_1$ is defined to be a width of the first opening 162, $w_2$ is defined to be a width of the second opening 172, $w_D$ is defined to be a width between a vertical projection of the first opening 162 and a vertical projection of the second opening 172, $t_1$ is defined to be a thickness of the first matrix 160, $t_2$ is defined to be a thickness of the second matrix 170, and $t_D$ is defined to be a thickness between the first matrix 160 and the second matrix 170.

A minimum value ($\theta_{min}$) of the angle ($\theta_{sa}$) formed by the path of light ($L_{51}$ and $L_{52}$) that is diffuse-reflected, incident on the cover layer 176, and incident on the photo sensor (PS) with respect to the normal line on the one surface 178 of the cover layer 176 may be $\theta_{51}$ shown in FIG. 5, a maximum value ($\theta_{max}$) may be $\theta_{52}$ shown in FIG. 5, Equation 1-1 may be generated with reference to a minimum value ($\theta_{min}$), and Equation 1-2 may be generated with reference to a maximum value ($\theta_{max}$).

$$\tan\theta_{min} = \frac{w_D}{t_D} \qquad \text{[Equation 1-1]}$$

$$\tan\theta_{max} = \frac{w_1 + w_D + w_2}{t_1 + t_D + t_2} \qquad \text{[Equation 1-2]}$$

Therefore, the angle ($\theta_{sa}$) formed by the path of light ($L_{51}$ and $L_{52}$) that is diffuse-reflected, incident on the cover layer 176, and incident on the photo sensor (PS) with respect to the normal line on the one surface 178 of the cover layer 176 may be expressed as Equation 1.

$$\tan^{-1}\left(\frac{w_D}{t_D}\right) \leq \theta_{sa} \leq \tan^{-1}\left(\frac{w_1 + w_D + w_2}{t_1 + t_D + t_2}\right) \qquad \text{[Equation 1]}$$

Meanwhile, the critical angle may be expressed as Equation 2-1 according to the Snell's law.

$$\sin\theta_c = \frac{n_{air}}{n_S} \quad \text{[Equation 2-1]}$$

In Equation 2-1, $n_{air}$ signifies the refractive index of air, and $n_s$ signifies an average refractive index of the fingerprint recognition sensor 100.

The minimum angle ($\theta_{min}$) formed by the path of light ($L_{51}$ and $L_{52}$) incident on the photo sensor (PS) and the normal line on the one surface 178 of the cover layer 176 may be greater than the critical angle ($\theta_c$), which may be expressed as Equation 2-2.

$$\theta_{min} > \theta_c \quad \text{[Equation 2-2]}$$

When Equations 2-2, 2-1, and 1-1 are combined, the width ($w_D$) between the vertical projection of the first opening 162 and the vertical projection of the second opening 172 may satisfy Equation 2.

$$w_D > t_D \tan\left[\sin^{-1}\left(\frac{n_{air}}{n_S}\right)\right] \quad \text{[Equation 2]}$$

On the other hand, the thickness ($t_D$) between the first matrix 160 and the second matrix 170 may be about 0.1 μm to 20 μm, and the contrast ratio of the fingerprint image may be further improved within the range.

Figure 6:
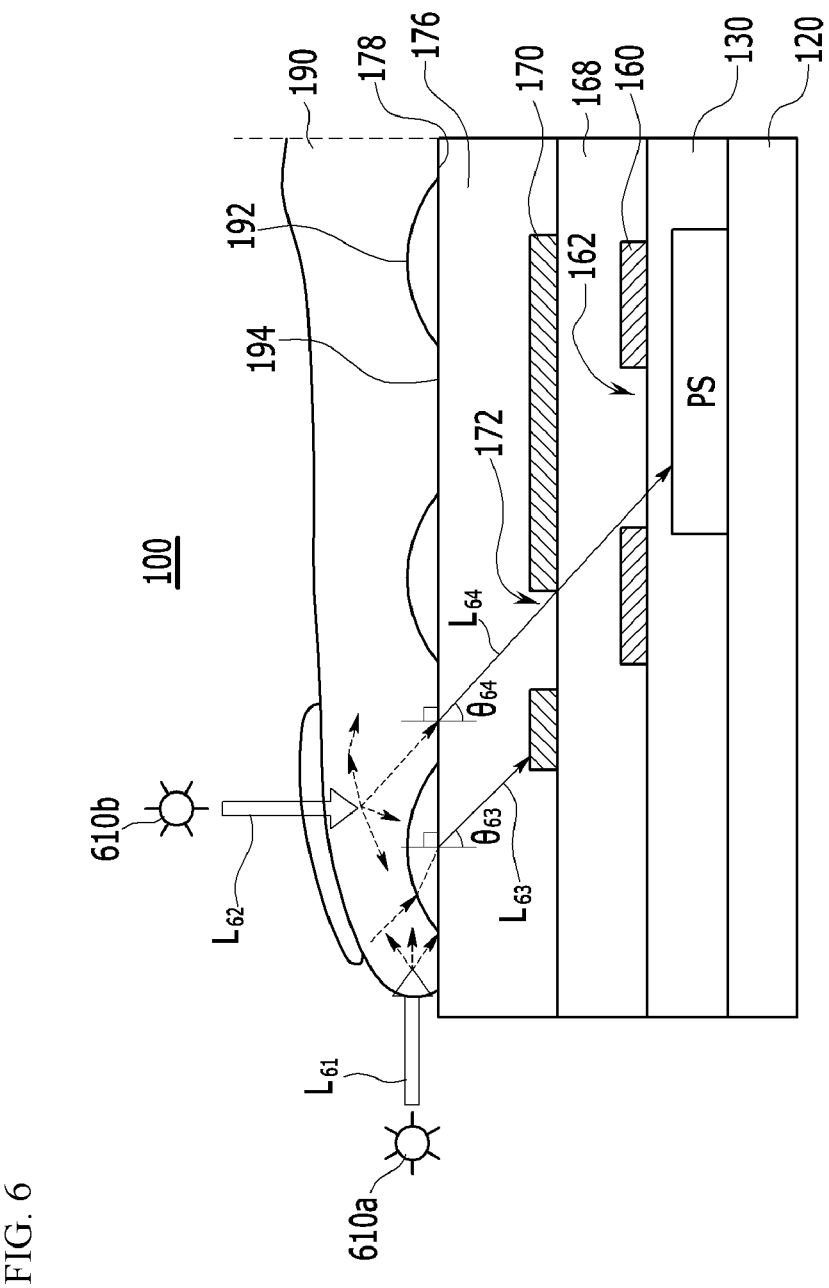
FIG. 6 shows a cross-section of a fingerprint recognition sensor according to an exemplary embodiment.

FIG. 6 shows a cross-section of a fingerprint recognition sensor according to an exemplary embodiment. The first matrix 160 and the second matrix 170 are shown to have a single layer structure in FIG. 6, but the same description as that to be described below is applicable to the case when the second matrix 170 has a structure including a first light absorbing layer 170b and a first metal layer 170a, the case when the first matrix 160 includes a second metal layer 160a and a second light absorbing layer 160b, and the case when the first matrix 160 and the second matrix 170 respectively have a two-layered structure.

Referring to FIG. 6, light sources 610a and 610b may be positioned on a side of the finger 190, and may be positioned on an upper portion of the finger 190.

In this case according to an exemplary embodiment, light ($L_{61}$ and $L_{62}$) irradiated to the finger 190 from the light sources 610a and 610b is diffuse-reflected at the finger 190, and some light ($L_{63}$ and $L_{64}$) may be incident on the cover layer 176. From among light ($L_{63}$ and $L_{64}$) incident on the cover layer 176, the light ($L_{63}$) input from the valley 192 of the fingerprint is not incident on the photo sensor (PS), and the light ($L_{64}$) input from the ridge 194 of the fingerprint may be incident on the photo sensor (PS) and may then be sensed.

Therefore, positions of the light sources (110, 610a, and 610b) may be designed in various ways, so they may be applied in various ways according to configurations or conditions of a device to which the fingerprint recognition sensor 100 will be applied.

Figure 7A:
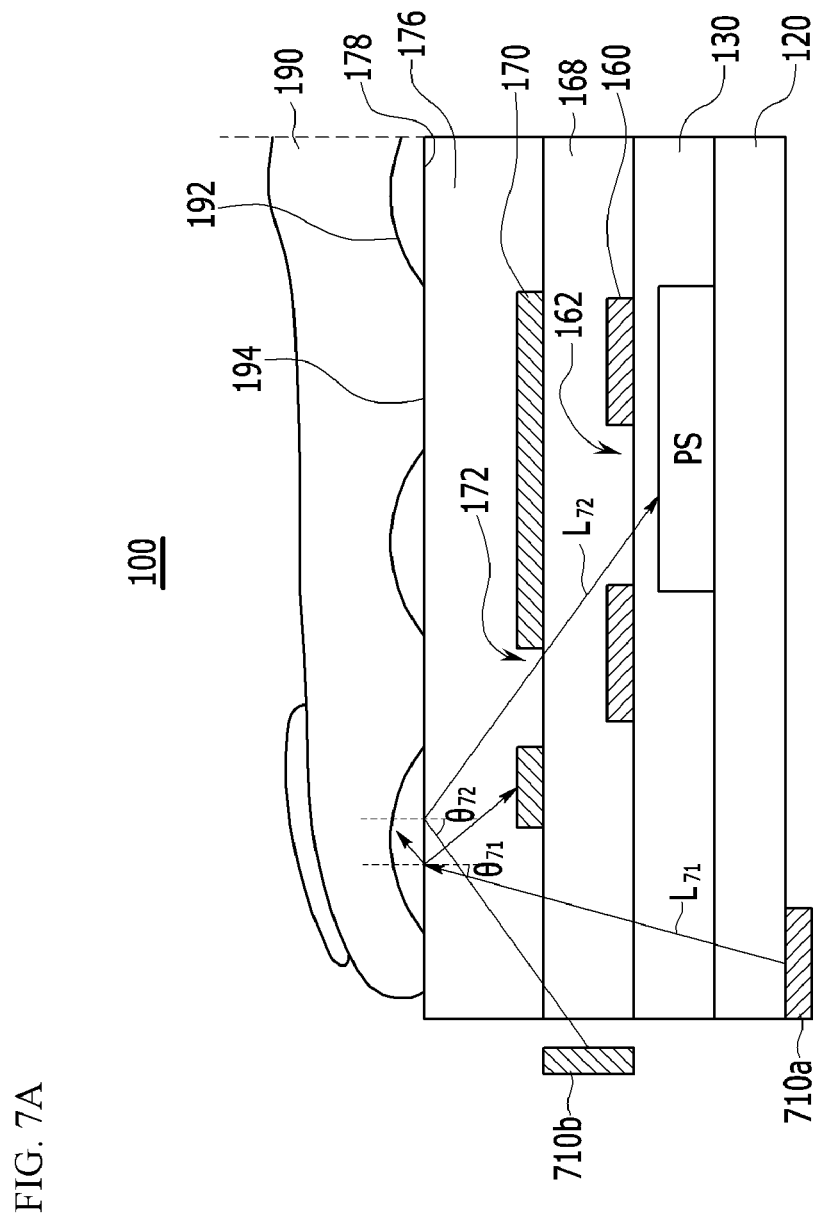
FIG. 7A and FIG. 7B show examples in which a light source of a fingerprint recognition sensor according to an exemplary embodiment exists below a finger.
Figure 7B:
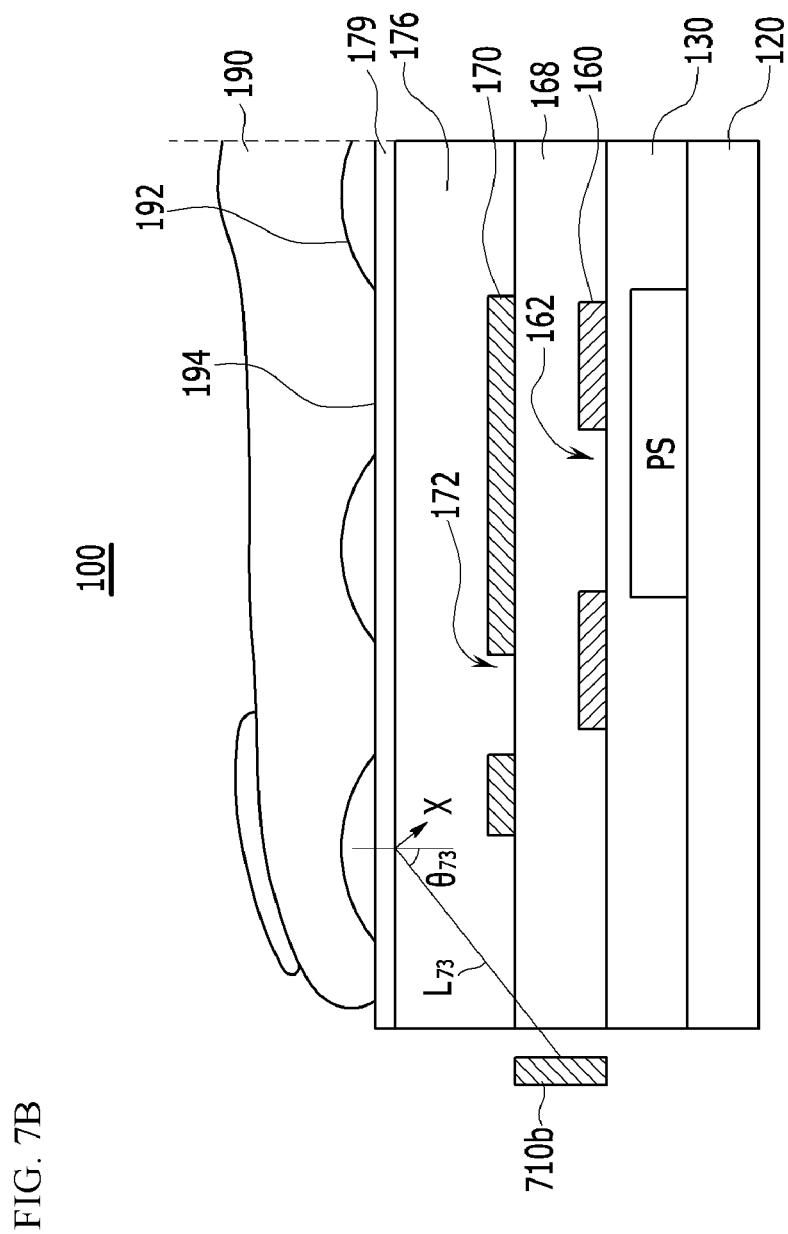

FIG. 7A and FIG. 7B show examples in which a light source of a fingerprint recognition sensor according to an exemplary embodiment exists below a finger. The first matrix 160 and the second matrix 170 are shown to have a single layer structure in FIG. 7A and FIG. 7B, but the same description as that to be described below is applicable to the case when the second matrix 170 has a structure including a first light absorbing layer 170b and a first metal layer 170a, the case when the first matrix 160 has a structure of including a second metal layer 160a and a second light absorbing layer 160b, and the case when the first matrix 160 and the second matrix 170 respectively have a two-layered structure.

Referring to FIG. 7A, light sources 710a and 710b may be positioned below of the finger 190.

In this instance, the light source 710a may be disposed so that the angle ($\theta_{71}$) formed by the irradiated light (L71) with respect to the normal line on the one surface 178 of the cover layer 176 may be less than the critical angle ($\theta_c$).

On the contrary, when the angle ($\theta_{72}$) formed by the light ($L_{72}$) irradiated by a compared light source 710b with respect to the normal line on the one surface 178 of the cover layer 176 is formed to be greater than the critical angle ($\theta_c$), total reflection may be generated on the one surface 178 of the cover layer 176. The total reflection may be generated when the light ($L_{72}$) is irradiated to a region corresponding to the valley 192 of the fingerprint on the one surface of the cover layer 176. When a total reflection is generated on the one surface 178 corresponding to the valley 192 of the fingerprint, the totally reflected light may be incident on the photo sensor, and hence, the portion corresponding to the valley 192 of the fingerprint becomes bright in the fingerprint image, thereby deteriorating the degree of definition and the contrast ratio of the fingerprint image.

Referring to FIG. 7B, so as to prevent the total reflection that may be generated depending on the position of the light source, the fingerprint recognition sensor 100 may further include an antireflection layer 179 positioned on an upper portion of the second matrix 170.

The antireflection layer 179 may be formed in known various ways, it may include various materials, and it may include at least two layers. In addition, the antireflection layer 179 may be positioned on the cover layer 176, and it may be positioned between the cover layer 176 and the second matrix 170.

Figure 8:
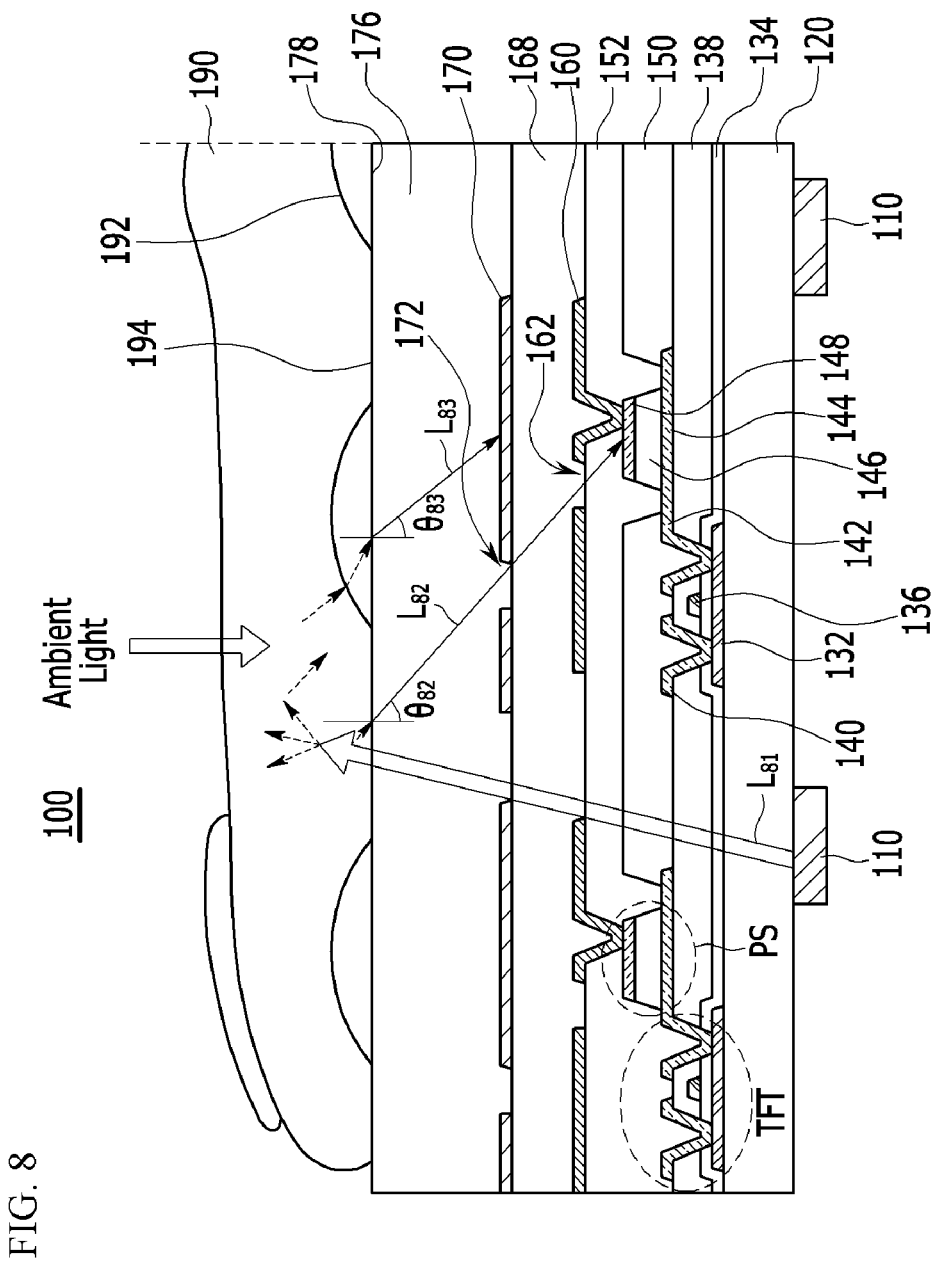
FIG. 8 shows a cross-section of a fingerprint recognition sensor according to an exemplary embodiment.

FIG. 8 shows a cross-section of a fingerprint recognition sensor according to an exemplary embodiment. The first matrix 160 and the second matrix 170 are shown to have a single layer structure in FIG. 8, but the same description as that to be described below is applicable to the case when the second matrix 170 has a structure including a first light absorbing layer 170b and a first metal layer 170a, the case when the first matrix 160 has a structure including a second metal layer 160a and a second light absorbing layer 160b, and the case when the first matrix 160 and the second matrix 170 respectively have a two-layered structure.

Referring to FIG. 8, the fingerprint recognition sensor 100 includes a light source 110, a substrate 120, a thin film transistor (TFT), a photo sensor (PS), a first matrix 160, a second matrix 170, and a cover layer 176.

A sensor pixel 130 is a region where a plurality of scan lines (SL1 to SLn) cross a plurality of data lead-out lines (DL1 to DLm) on the substrate 120, and each sensor pixel 130 includes a photo sensor (PS) and a thin film transistor (TFT). The thin film transistor (TFT) is electrically connected to the scan lines (SLn) and the data lead-out line (DLm).

Here, the thin film transistor (TFT) may include a channel layer 132, a gate electrode 136, a source electrode 140, and a drain electrode 142.

The light source 110 irradiates light ($L_{81}$) to the finger 190. The light source 110 is shown in FIG. 8 to be positioned on a lower side of the substrate 120, but the light source 110 may be disposed on various positions as described above.

A gate insulation layer 134 may be positioned between the channel layer 132 and the gate electrode 136, and a first insulation layer 138 may be positioned on the gate electrode 136. The source electrode 140 and the drain electrode 142 are positioned on the first insulation layer 138, and respectively contact the channel layer 132 through a contact hole.

However, the thin film transistor (TFT) shown in FIG. 8 is exemplified for ease of description, and it may be designed with various configurations. The channel layer 132 may include low-temperature polysilicon (LTPS), amorphous silicon (a-Si), or an oxide.

The thin film transistor (TFT) may, for example, have one of a co-planar structure, a staggered structure, an inverted co-planar structure, and an inverted staggered structure.

The photo sensor (PS) includes a first electrode 144 formed by extending the drain electrode 142 of the thin film transistor (TFT), a semiconductor layer 146 positioned on the first electrode 144, and a second electrode 148 including a transparent material and positioned on the semiconductor layer 146. A passivation layer 150 for protecting the thin film transistor (TFT) may be positioned on the same layer as the photo sensor (PS), a second insulation layer 152 may be positioned on the photo sensor (PS) and the passivation layer 150, and a bias electrode 160 is connected to the second electrode 148 through a contact hole. Here, the first electrode 144 and the second electrode 148 may form a capacitor.

The semiconductor layer 146 of the photo sensor (PS) may include, for example, amorphous silicon (a-Si), an organic material, or a quantum dot.

Regarding the fingerprint recognition sensor 100 according to an exemplary embodiment, the first matrix 160 may be the bias electrode 160. The bias electrode 160 includes a first opening 162 for light ($L_{82}$) incident on the photo sensor (PS) to penetrate through.

A planarization film 168 may be positioned on the second insulation layer 152 and the bias electrode 160. The planarization film 168 may protect the thin film transistor (TFT) and the photo sensor (PS) of the lower portion, and may planarize elements.

The second matrix 170 may be positioned on the planarization film 168, and the cover layer 176 may be positioned on the second matrix 170 and the planarization film 168.

From among light ($L_{82}$ and $L_{83}$) that is diffuse-reflected from the finger 190, the light ($L_{82}$) incident on the cover layer 176 through the ridge 194 of the fingerprint, and having the angle ($\theta_{82}$), formed by the simultaneously input light ($L_{82}$) with respect to the normal line on the one surface 178 of the cover layer 176, that is equal to or greater than the critical angle ($\theta_c$), may sequentially pass through the second opening 172 and the first opening 162 and may be incident on the photo sensor (PS). On the contrary, from among light ($L_{82}$ and $L_{83}$) that is diffuse-reflected from the finger 190, the light ($L_{83}$) incident on the cover layer 176 through the valley 192 of the fingerprint may be completely blocked by the first matrix 160 or the second matrix 170. Therefore, the contrast ratio of the fingerprint image may be substantially improved.

Figure 9A:
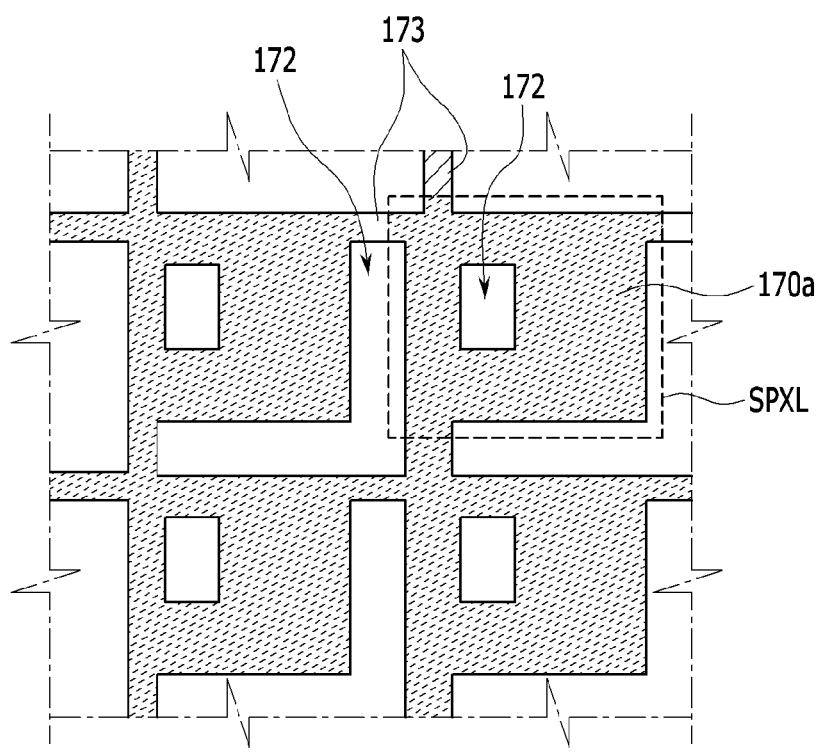
FIG. 9A and FIG. 9B show a planar view of a second matrix of a fingerprint recognition sensor according to exemplary embodiments.
Figure 9B:
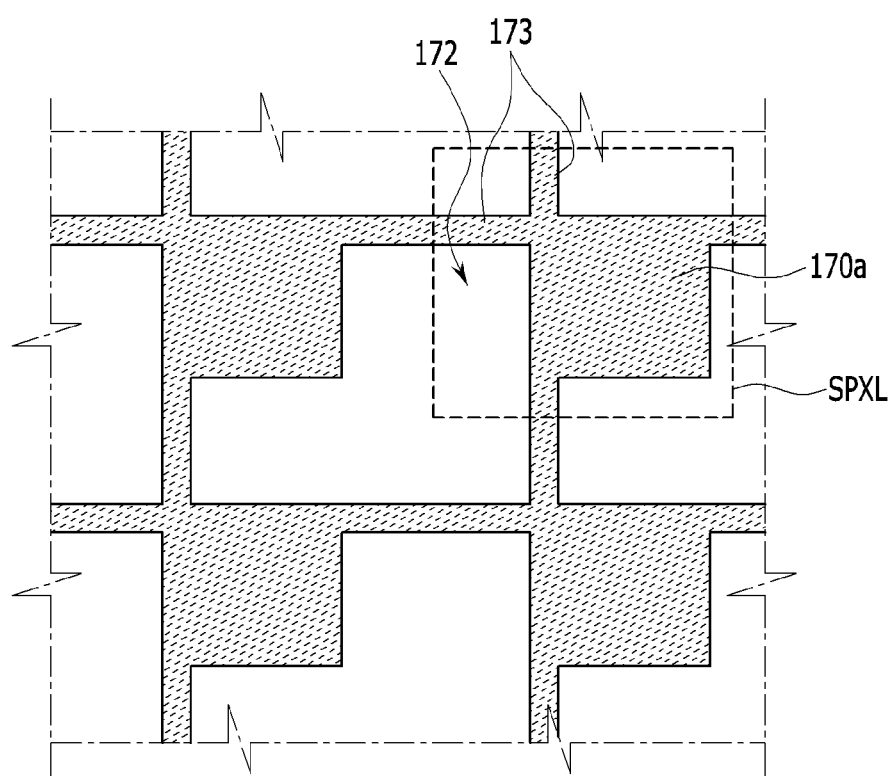

FIG. 9A and FIG. 9B show a planar view of a second matrix of a fingerprint recognition sensor according to exemplary embodiments. FIG. 9A and FIG. 9B show a portion corresponding to four sensor pixels (SPXL). Further, FIG. 9A and FIG. 9B shows the case in which the second matrix has two layer structures (a first metal layer and a first light absorbing layer).

In a planar view, the second matrix 170 and the second opening 172 may be arranged as shown in FIG. 9A, they may be arranged as shown in FIG. 9B, and they may be arranged with a structure that is not shown.

Regarding the fingerprint recognition sensor 100, a plurality of scan lines (SL1 to SLn) may cross a plurality of data lead-out lines (DL1 to DLm), a sensor pixel (SPXL) may be defined for each crossing region, and a second matrix 170 may be disposed on each sensor pixel (SPXL). When the second matrix 170 is shown in a planar view, the first metal layer 170a on an upper portion in the second matrix 170 may be electrically connected to the first metal layer 170a of the second matrix 170 of the adjacent sensor pixel (SPXL) through a conductive connection structure 173. By this, one common voltage may be applied to the second matrix 170 of all sensor pixels (SPXL).

When there is no electrical connection structure between the second matrices 170 of the sensor pixels (SPXL), the first metal layers 170a of the second matrix 170 may float, and noise may accordingly occur. The first metal layers 170a according to exemplary embodiments are electrically connected, the floating phenomenon may be prevented, and generation of noise may be minimized.

Figure 10:
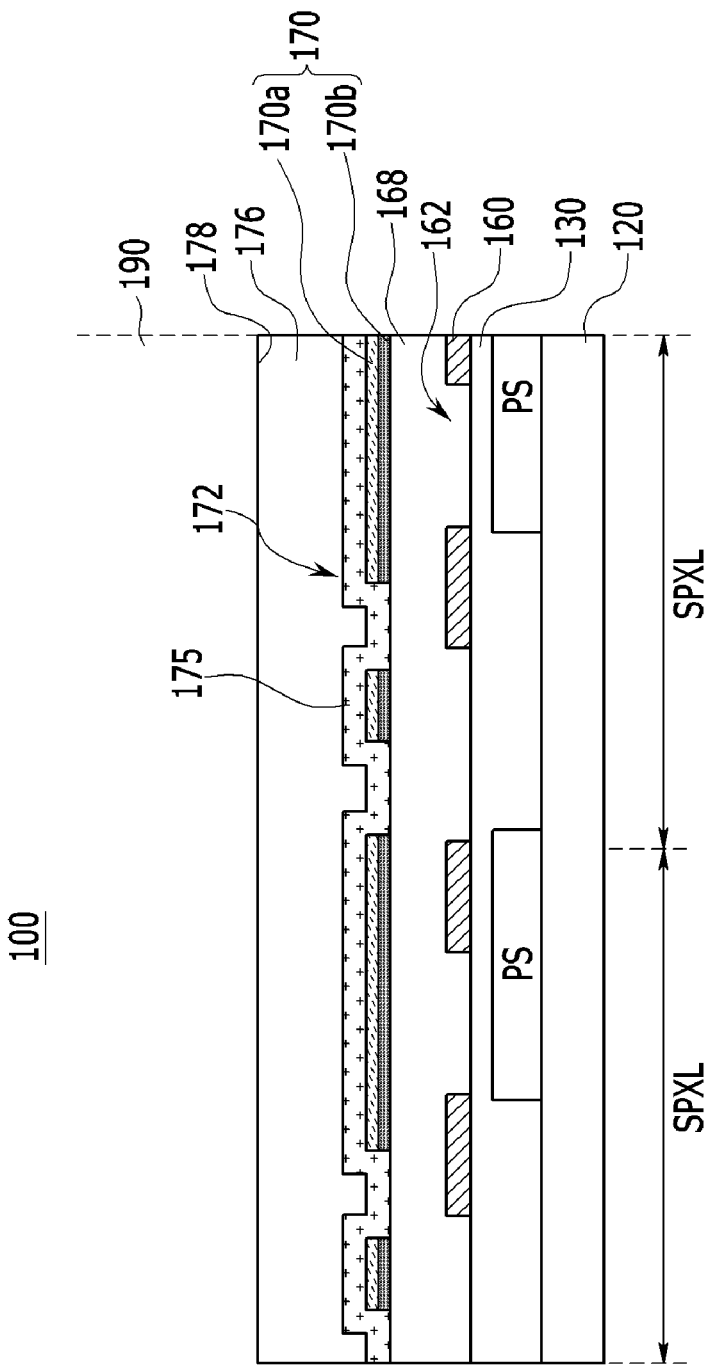
FIG. 10 shows a cross-section of a fingerprint recognition sensor according to an exemplary embodiment.

FIG. 10 shows a cross-section of a fingerprint recognition sensor according to an exemplary embodiment. FIG. 10 shows a portion corresponding to four sensor pixels (SPXL), and a case in which the second matrix has two layer structures (a first metal layer and a first light absorbing layer). The first matrix 160 is shown to have a single layer structure in the drawing, and the case in which the first matrix 160 has two layer structures (a second metal layer and a second light absorbing layer).

The fingerprint recognition sensor 100 may be positioned on the second matrix 170, and may include a transparent electrode 175 including a transparent conductive oxide. The transparent electrode 175 covers the first metal layer 170a, and mat be installed in all the sensor pixels (SPXL).

The transparent electrode 175 may apply one common voltage to the first metal layer 170a of the second matrix 170, and by this, the floating phenomenon of the first metal layer 170a may be prevented, and generation of noise may be minimized.

Here, the cover layer 176 is shown in the drawing, but the structure of the cover layer 176 may be omitted, and in this case, the transparent electrode 175 may be a passivation layer or a cover layer for protecting lower constituent elements.

The fingerprint recognition sensor 100 may be applied to various devices such as a display device (not shown).

For example, the display device (not shown) may include a display panel (not shown) for displaying an image or video, and a fingerprint recognition sensor 100 positioned in at least one region of a display panel (not shown), and the fingerprint recognition sensor 100 may provide a fingerprint image with a substantially improved contrast ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: fingerprint recognition sensor
120: substrate
PS: photo sensor
160: first matrix
160b: second light absorbing layer
170: second matrix
170b: first light absorbing layer
173: conductive connection structure
176: cover layer
190: finger
194: ridge of fingerprint
110: light source
130: sensor array
TFT: thin film transistor
160a: second metal layer
162: first opening
170a: first metal layer
172: second opening
175: transparent electrode
178: one surface of cover layer
192: valley of fingerprint

What is claimed is:

1. A fingerprint recognition sensor comprising:
a photo sensor for sensing light that is diffuse-reflected from a finger of a user and incident on the photo sensor, or that is transmitted through the finger and incident on the photo sensor;
a first matrix positioned on the photo sensor and including a first opening;
a second matrix positioned on the first matrix and including a second opening; and
a cover layer including one surface contacting the finger and positioned on the second matrix,
wherein, from among light that is diffuse-reflected from the finger and incident on the cover layer or that is transmitted through the finger and incident on the cover layer, light having an angle, formed by a normal line on the one surface of the cover layer and a path of the light incident on the cover layer, that is greater than a critical angle, sequentially passes through the second opening and the first opening and is incident on the photo sensor, and
the angle formed by the normal line on the one surface of the cover layer and the path of light incident on the photo sensor satisfies Equation 1:

$$\tan^{-1}\left(\frac{w_D}{t_D}\right) \le \theta_{sa} \le \tan^{-1}\left(\frac{w_1 + w_D + w_2}{t_1 + t_D + t_2}\right) \quad \text{[Equation 1]}$$

wherein, in Equation 1, $\theta_{sa}$ is an angle formed by the normal line on the one surface of the cover layer and the path of light incident on the photo sensor, $w_1$ is a width of the first opening, $w_2$ is a width of the second opening, $w_D$ is a width between a vertical projection of the first opening and a vertical projection of the second opening, $t_1$ is a thickness of the first matrix, $t_2$ is a thickness of the second matrix, and $t_D$ is a thickness between the first matrix and the second matrix,
wherein
the width between a vertical projection of the first opening and a vertical projection of the second opening satisfies Equation 2:

$$w_D > t_D \tan\left[\sin^{-1}\left(\frac{n_{air}}{n_S}\right)\right] \quad \text{[Equation 2]}$$

wherein, in Equation 2, $w_D$ is a width between a vertical projection of the first opening and a vertical projection of the second opening, $t_D$ is a thickness between the first matrix and the second matrix, $n_{air}$ is a refractive index of air, and $n_s$ is an average refractive index of the fingerprint recognition sensor.

2. The fingerprint recognition sensor of claim 1, wherein the second matrix includes a first light absorbing layer including a light absorbing material, and a first metal layer positioned on the first light absorbing layer.

3. The fingerprint recognition sensor of claim 2, wherein light incident on the cover layer from a ridge of a fingerprint of the finger is incident on the photo sensor, and
light incident on the cover layer from a valley of a fingerprint of the finger is reflected from the first metal layer or is reflected from or absorbed into the first matrix.

4. The fingerprint recognition sensor of claim 1, further comprising
a light source for irradiating light to the finger, wherein the light source is positioned below the finger, and
the light source is disposed so that an angle formed by light irradiated from the light source with respect to a normal line on one surface of the cover layer is less than the critical angle.

5. The fingerprint recognition sensor of claim 1, further comprising
a light source for irradiating light to the finger, wherein the light source is positioned below the finger, and
an antireflection layer positioned on the second matrix is further included.

6. The fingerprint recognition sensor of claim 1, wherein the first opening overlaps the second matrix, and the second opening overlaps the first matrix.

7. The fingerprint recognition sensor of claim 1, wherein a refractive index of the cover layer is greater than 1.0 and is equal to or less than 2.0, and the critical angle is equal to or greater than 30° and is less than 90°.

8. The fingerprint recognition sensor of claim 1, wherein a thickness ($t_D$) between the first matrix and the second matrix is 0.1 to 20 μm.

9. The fingerprint recognition sensor of claim 2, wherein a thickness of the second matrix is 140 to 1000 nm.

10. The fingerprint recognition sensor of claim 2, wherein the fingerprint recognition sensor is divided into a plurality of sensor pixels, the second matrix is positioned on one of the plurality of sensor pixels, and another second matrix of another sensor pixel adjacent to the one of the plurality of sensor pixels is electrically connected to the second matrix.

11. The fingerprint recognition sensor of claim 2, wherein a transparent electrode positioned on the second matrix and including a transparent conductive oxide is included.

12. The fingerprint recognition sensor of claim 2, wherein the first matrix includes a second metal layer and a second light absorbing layer positioned on the second metal layer and including a light absorbing material.

13. The fingerprint recognition sensor of claim 1, further comprising
a thin film transistor for transmitting a current signal caused by generation of charges by the photo sensor to a data lead-out line,
wherein the photo sensor includes a first electrode on which a drain electrode of the thin film transistor is extended to be formed, a semiconductor layer positioned on the first electrode, and a second electrode including the transparent material and positioned on the semiconductor layer, and wherein the first electrode and the second electrode form a capacitor.

14. The fingerprint recognition sensor of claim 1, wherein the first matrix includes a metal layer and a light absorbing layer positioned on the metal layer and including a light absorbing material.

15. The fingerprint recognition sensor of claim 14, wherein
light incident on the cover layer from a ridge of a fingerprint of the finger is incident on the photo sensor, and
light incident on the cover layer from a valley of a fingerprint of the finger is reflected from or absorbed into the second matrix, or is absorbed by the light absorbing layer.

16. The fingerprint recognition sensor of claim 14, wherein
a thickness of the first matrix is 140 to 1000 nm.

17. A display device comprising a display panel for displaying an image or video, and a fingerprint recognition sensor of claim 1 provided in at least one region on the display panel.

\* \* \* \* \*